United States Patent
Kuo et al.

(10) Patent No.: US 7,118,440 B2
(45) Date of Patent: Oct. 10, 2006

(54) SPRAY WITH CARBON NANOTUBES AND METHOD TO SPRAY THE SAME

(75) Inventors: Chihche Kuo, Taipei (TW); Yu-An Li, Taipei (TW); Shie Heng Lee, Taipei (TW); Kuei Wen Cheng, Taipei (TW)

(73) Assignee: Teco Nanotech Co., Ltd., Taipei (TW)

( * ) Notice: Subject to any disclaimer, the term of this patent is extended or adjusted under 35 U.S.C. 154(b) by 280 days.

(21) Appl. No.: 10/753,501

(22) Filed: Jan. 9, 2004

(65) Prior Publication Data

US 2005/0153618 A1    Jul. 14, 2005

(51) Int. Cl.
*H01J 9/04*    (2006.01)
(52) U.S. Cl. .......................... 445/51; 445/50; 252/502; 252/510
(58) Field of Classification Search ................ 313/336, 313/310, 311, 495; 445/49–51
See application file for complete search history.

(56) References Cited

U.S. PATENT DOCUMENTS 6,290,564 B1 * 9/2001 Talin et al. .................... 445/50
2001/0024078 A1 * 9/2001 Dimitrijevic et al. ........ 313/311
2003/0092207 A1 * 5/2003 Yaniv et al. .................. 438/20
2004/0169151 A1 * 9/2004 Yagi et al. ............... 250/492.2

\* cited by examiner

*Primary Examiner*—Mariceli Santiago
*Assistant Examiner*—Christopher M. Raabe
(74) *Attorney, Agent, or Firm*—Rosenberg, Klein & Lee

(57) ABSTRACT

A spray with carbon nanotubes and a method for spraying the spray to get an electron emitting source layer are provided. Choosing a proper and vaporizable solvent to disperse and suspend the carbon nanotubes scattered therein. To mixed up the carbon nanotubes with a binder or an additive to be the spray with a low viscosity. The solvent mixed is carried with a high-pressure air to spray uniformly on a negative conductive layer or a negative glass substrate, a thickness of a film sprayed by the solvent mixed can be adjusted and controlled by a spraying frequency thereof, and the film can be even and uniform and the carbon nanotubes can expose out easily to generate electrons and increase current density thereby in the spraying manner.

9 Claims, 2 Drawing Sheets

SPRAY WITH CARBON NANOTUBES AND METHOD TO SPRAY THE SAME

BACKGROUND OF THE INVENTION

1. Field of the Invention

The present invention relates to a technique of an electronic source arranged on a negative plate of a FED (Field Emission Display), and particularly relates to a technique adopted for spraying carbon nanotubes on a negative plate of a FED.

According to the present invention, the method provides a layer of a film sprayed by a solvent of a low viscosity and a high volatility with carbon nanotubes can expose the carbon nanotubes out of the layer of the solvent due to the spraying process under high-pressure air, because that particles from a binder or an additive with heavier specific weight deposit on a cathode or a surface of a negative glass substrate during the spraying process than that of the carbon nanotubes, so as to expose the carbon nanotubes out of the layer of the solvent under the high-pressure air for emitting large quantity of electrons and magnifying electric currents thereof.

2. Background of the Invention

The FED of the present invention is a device with a cathode electron emitter generating electrons within an electric field to excite phosphor materials covered on an anode thereof. The FED provides characteristics of light-weight and thin, sizes of an effective displaying area being adjustable to meet requirements, but without problems of view angles, which exist in a Flat LCD (Flat Liquid Crystal Display).

Figure 1:
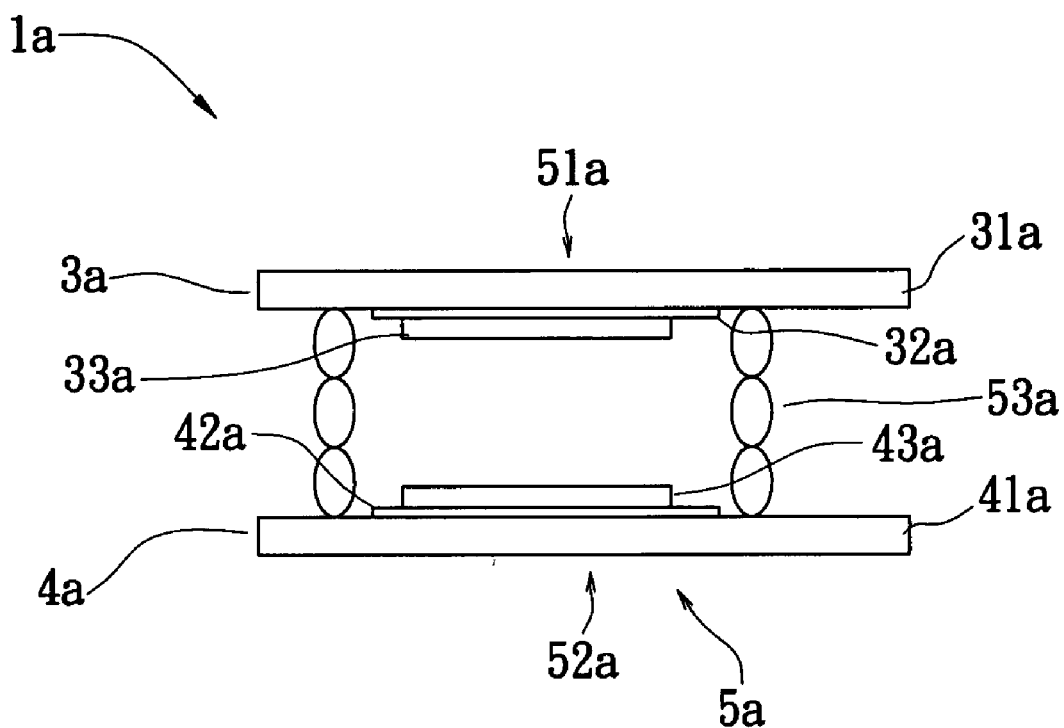

Referring to FIG. 1, a conventional FED 1a includes an anode 3a, a cathode 4a, and a rib 53 disposed between the anode 3a and the cathode 4a for separating the cathode 4 from the anode 3a, providing a support between the anode 3a and the cathode 4a, and including a vacuum cavity formed therebetween. See FIG. 1, the anode 3a includes a positive glass substrate 31a, an anode conductive layer 32a and a phosphor powder layer 33a; the cathode 4a includes a negative glass substrate 41a, a cathode conductive layer 42a and a electron emitting source layer 43a. With reference to the rib 53a in FIG. 1, the conventional FED 1a discloses functions, which the rib 53a provides, apparently for providing connections between the positive glass substrate 31a and the negative glass substrate 41a. By providing an electric field additionally, the electron emitting source layer 43a generates electrons and emits the electrons to the phosphor powder layer 33a of the anode 3a, and to avoid the positive glass substrate 31a electrically connecting the negative glass substrate 41a within the electric field, the rib 53a is supposed to be made of dielectric materials. According to a unit 5a shown in FIG. 1, includes an anode unit 51a and a cathode unit 52a, the rib 53a arranges between the anode unit 51a and the cathode unit 52a. Because the electrons generates due to the electric field (E), an electric field intensity thereof is in a direct proportion to a voltage adopted for the anode unit 51a and the cathode unit 52a, and in an inverse proportion to a distance between the anode unit 51a and the cathode unit 52a. The distance between the anode unit 51a and the cathode unit 52a obviously affect the electric field intensity thereof, therefore, even and uniform thickness of the electron emitting source layer 43a, the phosphor powder layer 33a and the rib 53a makes an important role in the conventional FED 1a and affect light uniformity thereof.

Recently, a newly carbon nanotube material is presented by Iijima in 1991 (see Nature 354, 56 (1991)). The newly carbon nanotube material provides a high aspect ratio, a high mechanical intensity and a high chemical resistance with a high abrasion resistance and a low threshold electric field, accordingly, the newly carbon nanotube material is applied to a filed emission electrons and to be studied broadly (referring to Science 269, p 1550 (1995); SID'98 Digest, p 1052 (1998); SID'01 Digest, p 316 (2001)). Wherein the so-called filed emission is a condition of a high electric field forcing on a material to diminish a thickness of an energy barrier thereof and electrons departing a surface of the material to be a free electron (with respect to J. Appl. Phys. 93, 7, pp 3504–3504 (1968)) by a quantum-mechanical tunneling effect. Thus, the electric currents due to the filed emission can be improved by the material surface with a low work function, the electrons generates without a constant heat source but with the material with the electric filed instead, and the filed emission device is called "cold cathode" thereby. The carbon nanotubes are adopted for the electron emitting source layer 43a of the negative glass substrate 41a of the conventional FED 1a.

Figure 2:
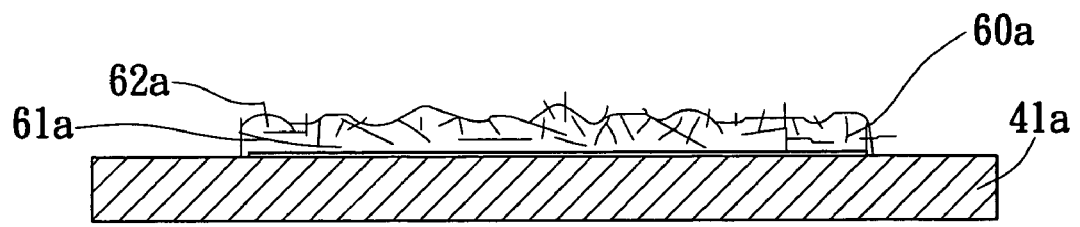

Methods for producing an electron emitting source layer with the carbon nanotubes are in different manners. In an CVD (Chemical Vapor Deposition) process, a carbon atom is deposited to continue each carbon nanotube of a negative substrate, although the method can provides a uniform length with stably growth to the carbon nanotubes, costs thereof are still high and sizes thereof are under 20 inches. To conquer the difficulty mentioned above, a method providing each layer thereof with a thick-film process results in the electron emitting source layer manufactured by screen printing and patents or articles in periodicals of the like; however, referring to FIG. 2, a electron emitting source layer 60a still has problems to solve. First, pastes for screen printing needs a high viscosity with at least 100,000 centi poise (cPs) to maintain precisions and configurations of design patterns thereof, besides the pastes further include binders (such as glass powders or the like), surfactants and conductive agents (such as silver or the like). And it's so difficult to disperse the carbon nanotube evenly with such a high viscosity and to avoid an effect of aggregation of the carbon nanotubes, which disturb the uniform distribution of the electrons, that the method needs dispersants in addition, the pastes have complex ingredients so as to increase the costs and to hazard dangerous oxides after sintering. Second, for processing the screen printing, thickness of each layer thereof is limited by a minimum thickness according to an emulsion of a fabric of a screen plate, with respect to FIG. 2, the thickness of each layer thereof 60a usually is at least 10 μm (micro meter), and a plurality of meshes arranged on the fabric of the screen plate differ 4~8μm height therefrom to vary the thickness distribution of the design patterns. Third, the carbon nanotube 62a has a good aspect ratio, which even reaches 40, but in a normal case, the carbon nanotube 62a has to restrict a height thereof to scatter in the pastes to avoid influencing the printing process. Furthermore, the pastes embrace the carbon nanotube 62a thereof due to at least 10 μm thickness; part of the carbon nanotube 62a is still covered by the binders or conductive agents 61a even after sintering. Thus, efficiency of generating electrons decreases, for example, an electron emitting source layer with a multiple wall carbon nanotube is processed by the screen printing method, and when the electron emitting source layer is within a electric field (E) of 4 voltage per micrometer (V/μm), the electron emitting source layer still has a current density of 10 milliamperes per centimeter square (mA/cm$^2$) limited.

Requirements we need to meet include: how to cut off the costs of the electron emitting source layer with the carbon nanotube; how to control or correct errors the thickness of the electron emitting source layer, so that the FED can provide a uniform display; how to expose the carbon nanotube out of the electron emitting source layer to increase the current density. Therefore, we can provide a spray and a method of spraying with a carbon nanotube on an electron emitting source layer to meet requirements mentioned above. First, simplifying ingredients of the spray to reduce the costs. Second, controlling a thickness of the electron emitting source layer by the spraying process. Third, exposing the carbon nanotube out of the electron emitting source layer by the spraying process to increase the current density.

Hence, an improvement over the prior art is required to overcome the disadvantages thereof.

SUMMARY OF INVENTION

According to the conventional FED, the carbon nanotubes are manufactured during a CVD process. The conventional FED has to pay heavy costs due to complicated manufacturing steps and instruments in the evaporating process. Or an electron emitting source layer of the conventional FED processed with a screen printing probably has a various thickness and embraces the carbon nanotubes therein to effect a current density and an uniformity of the conventional FED. The present invention provides an electron emitting source layer in a spraying manner to control a thickness thereof, expose the carbon nanotubes, increase the current density, and cut off the costs and steps thereof.

The primary object of the invention is therefore to specify a method for spraying a spray with carbon nanotubes to control a thickness of an electron emitting source layer thereof to maintain a uniformity of the electron emitting source layer.

The secondary object of the invention is therefore to specify a gradient of the spray for exposing the carbon nanotubes to increase the current density thereof.

The third object of the invention is therefore to specify the method for spraying a spray with carbon nanotubes to cut off the costs and steps thereof to practice in commercial use.

According to the invention, this object is achieved by a method for spraying a spray with carbon nanotubes to get an electron emitting source layer. Choosing a proper and vaporizable solvent to disperse and suspend the carbon nanotubes scattered therein. To mixed up the carbon nanotubes with a binder or an additive to be the spray with a low viscosity. The solvent mixed is carried with a high-pressure air to spray uniformly on a negative conductive layer or a negative glass substrate, a thickness of a film sprayed by the solvent mixed can be adjusted and controlled by a spraying frequency thereof, and the film can be even and uniform in the spraying manner. The solvent mixed then vaporizes rapidly to expose the carbon nanotubes out of the film, and according to the high-pressure air, particles of binder and the additive have specific weights heavier than those of the carbon nanotubes to deposit on the surface of the negative conductive layer or the negative glass substrate, so that the carbon nanotubes can expose out easily to generate electrons and increase current density thereby.

The present invention provides a gradient of the spray including a plurality of carbon nanotubes, a solvent being vaporizing within a range of predetermined temperatures to suspend the carbon nanotubes scattered therein, a binder arranged in the solvent, and being a predetermined adhesive characteristic with predetermined interfaces after a predetermined adhesive process to be adherent between the carbon nanotubes and a surface of the cathode of the electronic device; whereby the solvent with the carbon nanotubes is sprayed on the surface of the cathode of the electronic device repeatedly, the solvent then vaporizes within the range of predetermined temperatures, and further after the predetermined adhesive process, the carbon nanotubes are dispersed and adhesive onto the surface of the cathode of the electronic device.

The present invention provides a method for spraying a spray with carbon nanotubes including steps of: (1) spraying the spray with carbon nanotubes on the surface of the cathode of the electronic device; (2) vaporizing the solvent within the range of predetermined temperatures; and (3) repeating the step (1) and (2) with predetermined times to get a film having a thickness within a predetermined range.

To provide a further understanding of the invention, the following detailed description illustrates embodiments and examples of the invention. Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

These and other features, aspects, and advantages of the present invention will become better understood with regard to the following description, appended claims, and accompanying drawings where:

FIG. 1 is a perspective view of a conventional FED;

FIG. 2 is a perspective view of an electron emitting source layer with screen printing; and FIG. 3 is a perspective view of an electron emitting source layer with a spraying process according to the present invention.

DETAILED DESCRIPTION OF THE EMBODIMENTS

The present invention provides a method for spraying a spray with carbon nanotubes to get an electron emitting source layer. Choosing a proper and vaporizable solvent to disperse and suspend the carbon nanotubes scattered therein. To mixed up the carbon nanotubes with a binder or an additive to be the spray with a low viscosity. The solvent mixed is carried with a high-pressure air to spray uniformly on a negative conductive layer or a negative glass substrate, a thickness of a film sprayed by the solvent mixed can be adjusted and controlled by a spraying frequency thereof, and the film can be even and uniform in the spraying manner. The solvent mixed then vaporizes rapidly to expose the carbon nanotubes out of the film, and according to the high-pressure air, particles of binder and the additive have specific weights heavier than those of the carbon nanotubes to deposit on the surface of the negative conductive layer or the negative glass substrate, so that the carbon nanotubes can expose out easily to generate electrons and increase current density thereby.

The present invention provides a spray gun filled with the high-pressure air to nebulize the spray for spraying the spray onto the surface of the negative conductive layer or the negative glass substrate. For mating with the solvent and a solid content thereof, the spray gun includes a high-pressure air valve having a flow rate ranged at least 200 liters per minute (l/min), the solvent includes a material of Isoamyl Actrate. After the solvent adds the needed binder, sintering to vaporize the solvent, the carbon nanotubes are adhesive onto the negative conductive layer or the negative glass substrate. The binder can include materials of glass powder or collodion. In addition, to add a silver powder to reduce impedance of the surface of the cathode of the electronic device, and to add a dispersant to disperse the carbon nanotubes and the powder scattered in the Isoamyl Actrate solvent uniformly, wherein the solvent has the viscosity arranged between 10 and 20 centi poise (cPs), and particularly arranged between 12 and 17 centi poise (cPs). The particles of the binder and the silver powder must be control to expose the carbon nanotubes and to prevent a weaving effect from chocking due to the carbon nanotubes growing too long, a ratio of a length of each carbon nanotube to a particle size of the powder can be arranged between 10:9 and 10:3, and particularly between 10:9 and 10:5.

Figure 3:
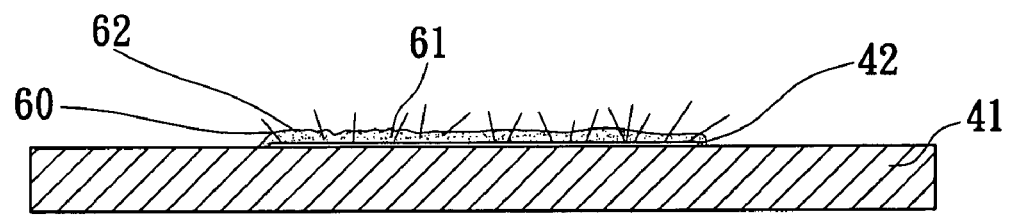

Consequently, the spray is sprayed and dispersed by the spray gun with the high-pressure air, referring to FIG. 3; the high-pressure air carries a plurality of suspended solids 61, such as binder, the silver powder and the carbon nanotubes onto a surface of the cathode 41. Because carbon nanotubes 62 have specific weight lighter than those of other particles, the glass powder, the binder, and the silver, the additive, are prior to be adhesive onto the surface of the cathode 41, the carbon nanotubes 62 then are adhesive onto a surface of the binder and the additive or a gap formed therebetween. In addition, the solvent with the material of Isoamyl Actrate, which has a high volatility. The solvent almost vaporizes after spraying processing, and carbon nanotubes can expose easily. An electron emitting source layer 60 has a thickness depends on the spraying frequency of the spray. In comparison to a conventional screen printing process, the conventional screen printing process provides a conventional electron emitting source layer with a high viscosity, which embrace the carbon nanotubes, the conventional screen printing process must provides a laser process or an etching process to expose the carbon nanotubes after a sintering process to oxidize the conventional solvent. The present invention processes without no more other procedure to expose the carbon nanotubes 62, and the thickness of the electron emitting source layer 60 is half thicker than the conventional electron emitting source layer.

According to a preferred embodiment of the present invention, the spray is made of Isoamyl Actrate materials. Especially the spray adds a binder, which is made of glass materials and has a range between 20 and 25 weight percentage, with an average particle size of 0.5 micrometer (μm). The spray further adds silver powder, which has a range between 10 and 18 weight percentage, with an average particle size of 0.5 micrometer (μm) to reduce the impendence of the electron emitting source layer. The spray additionally adds a plurality of multiple wall carbon nanotubes, which has a range between 5 and 10 weight percentage, with an average length of 1 micrometer (μm). Furthermore, the spray needs a dispersant scattered therein, and has the viscosity of a range between 15 and 17 centi poise (cPs). The spray is applied to the commercial spray gun with a nozzle having a diameter of 1.0 millimeters (mm), a high-pressure air valve having a flow rate of 260 liters per minute (l/min), and an adjustable solvent valve having a solvent flow rate controlled of 200 cubic centimeters per minute (cc/min). Accordingly the carbon nanotubes are dispersed on the negative conductive layer of the negative glass substrate with the spray to get the electron emitting source layer, and then sintering the negative glass substrate to combine the electron emitting source layer and the negative conductive layer. Thus, the thickness of the electron emitting source layer is between 3 and 4 micrometers (μm), which is thinner than that of the conventional electron emitting source layer of 10 micrometers (μm). The present invention provides an error of the thickness of the electron emitting source layer controlled below 1.5 micrometers (μm), so that the thickness of the electron emitting source layer is uniform and even. When the electron emitting source layer is within a electric field (E) of 4 voltage per micrometer (V/μm), the present invention provides a current density above 20 milliamperes per centimeter square (mA/cm$^2$).

With respect to FIG. 3, the present invention provides a gradient of the spray including a plurality of carbon nanotubes 62, a solvent being vaporizing within a range of predetermined temperatures to suspend the carbon nanotubes scattered therein, a binder arranged in the solvent, and being a predetermined adhesive characteristic with predetermined interfaces after a predetermined adhesive process to be adherent between the carbon nanotubes 62 and a surface of the cathode 41 of the electronic device; whereby the solvent with the carbon nanotubes 62 is sprayed on the surface of the cathode 41 of the electronic device repeatedly, the solvent then vaporizes within the range of predetermined temperatures, and further after the predetermined adhesive process, the carbon nanotubes 62 are dispersed and adhesive onto the surface of the cathode 41 of the electronic device.

The spray with the carbon nanotubes 62 includes further an additive being characteristic of reducing impedance of the surface of the cathode of the electronic device, and furthermore a dispersant to disperse the additive, the binder and the carbon nanotubes uniformly in the spray. The additive includes a material of silver powder, the binder includes a material of glass powder, the solvent includes a material of Isoamyl Actrate, and the spray has a viscosity arranged between 15 and 17 centi poise (cPs), and the predetermined adhesive process includes a sintering process or a laser heating process.

See FIG. 3, the present invention provides a method for spraying a spray with carbon nanotubes including steps of: (1) spraying the spray with carbon nanotubes on the surface of the cathode of the electronic device; (2) vaporizing the solvent within the range of predetermined temperatures; and (3) repeating the step (1) and (2) with predetermined times to get a film having a thickness within a predetermined range. Wherein the method further includes a step after the step (3), providing a predetermined adhesive process to get an electron emitting source layer, the predetermined adhesive process includes a sintering process, a laser heating process, or an etching process. The spray is used by a commercial spray gun, the commercial spray gun includes a nozzle having a diameter arranged between 0.5 and 2.0 millimeters (mm), a high-pressure air valve having a flow rate ranged between 240 and 280 liters per minute (l/min), and an adjustable solvent valve having a solvent flow rate controlled between 150 and 250 cubic centimeters per minute (cc/min), so that the electron emitting source layer has a thickness arranged between 3 and 6 micrometers (μm).

The present invention characterizes as:

1. The thickness of the electron emitting source layer can be controlled and adjusted uniformly by the spraying process.

2. The carbon nanotubes expose out of the electron emitting source layer easier than that of the conventional electron emitting source layer processed with screen printing, and lots of the electrons generates to increase the current density.

3. The solvent of the present invention simplifies the gradients thereof to diminish the costs thereof and practice into commercial use.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A spray with a plurality of carbon nanotubes adopted for a cathode of an electronic device, comprising:
    a plurality of carbon nanotubes having a predetermined length;
    a solvent including Isoamyl Actrate, said solvent vaporizing within a range of predetermined temperatures to suspend the carbon nanotubes scattered therein;
    a binder including glass powder having particles of a first size arranged in the solvent, said binder having a predetermined adhesive characteristic with predetermined interfaces resulting from a predetermined adhesive process between the carbon nanotubes and a surface of the cathode of the electronic device; and
    an additive including a silver powder having silver particles of a second size, said additive reducing an impedance of the surface of the cathode of the electronic device;
    wherein the spray includes approximately 20–25 weight percents of the binding, approximately 10–18 weight percents of the additive, and approximately 5–10 weight percent of the carbon nanotubes,
    wherein the relationship between said predetermined length of the carbon nanotubes and said first size of the glass powder particles is approximately 10:9, and the relationship between said predetermined length of the carbon nanotubes and said second size of the silver particles is in the range between 10:3 and 10:5;
    wherein the solvent with the carbon nanotubes is sprayed on the surface of the cathode of the electronic device repeatedly, and vaporizes within the range of predetermined temperatures, and
    wherein after the predetermined adhesive process, the carbon nanotubes are dispersed on and adhesive to the surface of the cathode of the electronic device.

2. The spray of claim 1, further including a dispersant to disperse the additive, the binder and the carbon nanotubes uniformly therein.

3. The spray of claim 2, wherein the spray has a viscosity in a range between 15 and 17 centi poise (cPs).

4. The spray of claim 1, wherein the predetermined adhesive process includes a sintering process or a laser heating process.

5. A method for spraying a spray with carbon nanotubes on a cathode of an electronic device, the method comprising the steps of:
    (1) preparing a spray containing approximately 5–10 weight % of carbon nanotubes with a predetermined nanotube length, a solvent including Isoamyl Actrate, approximately 20–25 weight % of a binder having a glass powder with particles of a first size, and 10–18 weight % of an additive including a silver powder having silver particles of a second size, wherein the relationship between said predetermined nanotube length and said first size of the glass powder particles is approximately 10:9, and the relationship between said predetermined nanotube length and said second size of the silver particles is approximately in the range between 10:3 to 10:5;
    (2) spraying the spray on a surface of the cathode of the electronic device;
    (3) vaporizing the solvent within the range of predetermined temperatures; and
    (4) repeating the steps (2) and (3) a predetermined number of times to obtain a film having a thickness within a predetermined range.

6. The method Of claimed as claim 5 further including a step of: after the step (4), providing a predetermined adhesive process to create an electron emitting source layer.

7. The method of claim 6, wherein the predetermined adhesive process includes a sintering process or a laser heating process.

8. The method of claim 6, wherein the electron emitting source layer has a thickness arranged between 3 and 6 micrometers ($\mu$m).

9. The method of claim 5, wherein the spray is sprayed by a spray gun, the spray gun including a nozzle having a diameter arranged between 0.5 and 2.0 millimeters (mm), a high-pressure air valve having a flow rate ranged between 240 and 280 liters per minute (l/mm), and an adjustable solvent valve having a solvent flow rate controlled between 150 and 250 cubic centimeters per minute (cc/mm).

* * * * *